C. W. MITCHELL.
CLUTCH BRAKE.
APPLICATION FILED JULY 15, 1914.
1,255,204.
Patented Feb. 5, 1918.
2 SHEETS—SHEET 2.
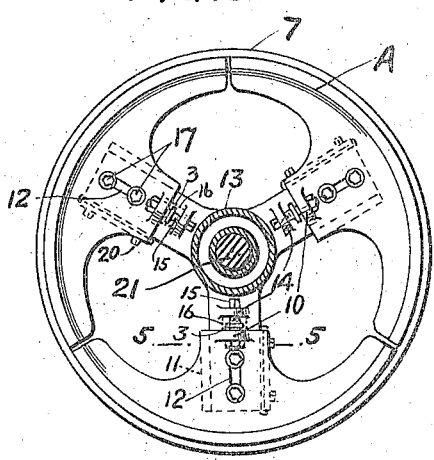
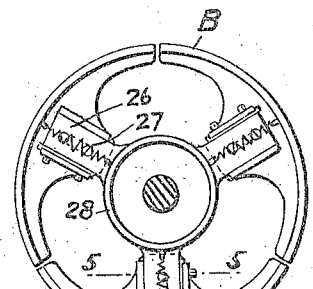
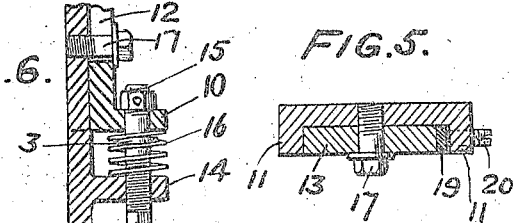
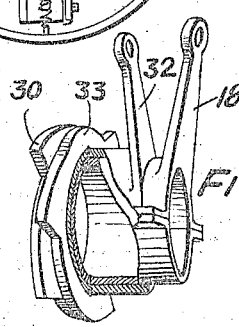
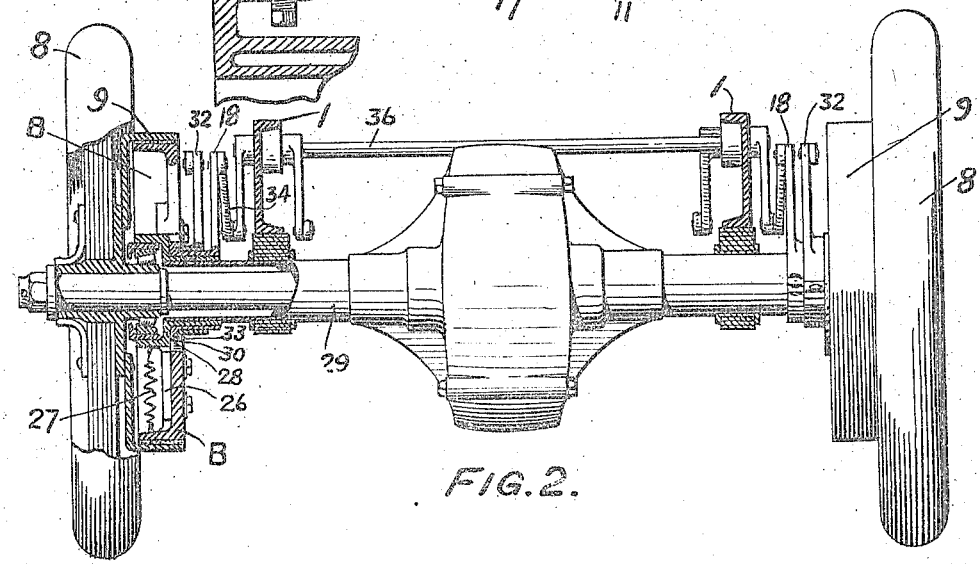
WITNESSES:
INVENTOR
Charles W. Mitchell
BY
ATTORNEY.

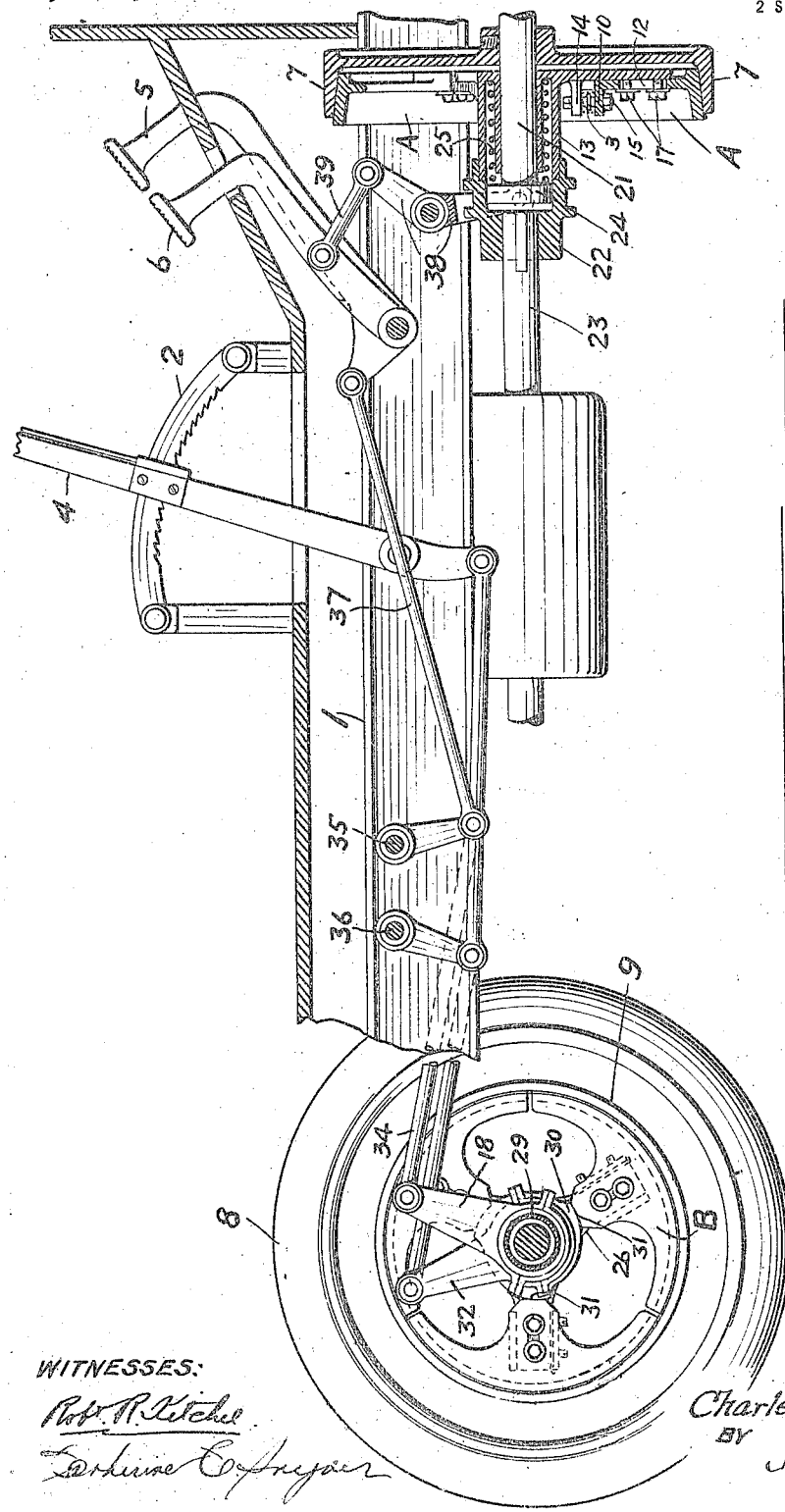

UNITED STATES PATENT OFFICE.

CHARLES W. MITCHELL, OF PHILADELPHIA, PENNSYLVANIA.

CLUTCH-BRAKE.

1,255,204.  Specification of Letters Patent.  Patented Feb. 5, 1918.

Application filed July 15, 1914. Serial No. 251,085.

*To all whom it may concern:*

Be it known that I, CHARLES W. MITCHELL, a citizen of the United States, and a resident of Philadelphia, in the county of Philadelphia and State of Pennsylvania, have invented certain new and useful Improvements in Clutch-Brakes, of which the following is a specification.

My invention relates to clutch brakes adapted to be connected with a moving member for the purpose of being moved by said moving member or of overcoming the movement thereof.

One of the objects of this invention is a clutch brake consisting of three radially movable parts and adapted to form a surface to correspond with that of the moving member for the purpose of engaging it uniformly over its entire friction surface, irrespective of wear.

Another object of this invention is a clutch brake which can be easily and quickly removed for repairs and remounted.

With these and similar objects in view my invention comprises the construction, combination and arrangement of parts hereinafter described, a preferred form of which is illustrated in the accompanying drawing, and embraced within the scope of the appended claims.

In the said drawing:—

Figure 1 is a fragmentary side elevation of an automobile provided with my improved clutch brakes one of which is shown in section in connection with the fly wheel of the motor, and a full view of the other is shown in connection with a rear wheel of the vehicle; Fig. 2 is a rear view of the automobile showing my rear wheel clutch brake in section; Fig. 3 is a front view of the clutch brake shown in section in Fig. 1; Fig. 4 is a rear view of the clutch brake shown in section in Fig. 2; Fig. 5 is a section on the line 5—5 of Fig. 3; Fig. 6 is an enlarged section of a fragment of the clutch brake in connection with the clutch sleeve, and Fig. 7 is a perspective view of a pair of operating cams in connection with the clutch brake shown in Fig. 4.

Referring more particularly to the drawing for a detail description of my invention, 1 represents the chassis, 2 a bracket provided with teeth for the brake hand-lever 4, 5 represents the brake foot-pedal, 6 the clutch pedal, 7 the fly wheel, and 8 the rear wheels. The fly wheel 7 is provided with an annular conical ring tapering rearwardly and outwardly. Adapted to be coupled with the fly wheel, I provide a clutch brake A having an exterior surface adapted to register with the interior surface of the fly wheel.

On one face of each rear wheel 8 is mounted a casing 9 having an interior cylindrical surface. Adapted to be coupled with each casing I provide a clutch brake B having an exterior cylindrical surface which corresponds with the surface of the casing.

The clutch brake A consists of three radial shoes, each provided with an outwardly extending flange 10, with sides 11 and with slots 12.

A sleeve 13 is provided with radial arms, each adapted to carry a brake shoe, and having a perforated flange 14 under the flange of the shoe. Each shoe is yieldingly connected with a corresponding arm by means of a bolt 15 which joins the flanges, and is held apart by a spring coil 16. The bolts are provided with heads on top of the shoe flanges 10 and with collars 3, below said flanges, to permit the shoes to slide on the bolt. Each shoe is guided on its arm by bolts 17 carried by the arm and extending through the slot 12 of the shoe. Each bolt is provided with a head and a washer thereunder which bears against the shoe.

The sides of each shoe embrace a corresponding arm, one of the sides being separated by a lining 19 adapted to take up any side play between the shoe and its carrying arm by means of the set screws 20.

The sleeve 13 is movably mounted on the shaft 21 whereon the fly wheel is mounted and is rigidly connected with a collar 22 slidingly keyed on the clutch shaft 23. The clutch shaft is provided with a bearing for the journal of the fly wheel shaft, which is provided with a collar 24 in front of the bearing. The sleeve 13 is provided with a cylindrical recess for a coil spring 25, adapted to force said sleeve in the direction of the fly wheel.

Each clutch brake B consists of the three shoes similar to the shoes of the clutch brake A which are slidingly mounted on arms 26, said shoes being connected by springs 27, with a sleeve 28, mounted on the casing 29 of the rear wheel axle. On the sleeve 28 is removably mounted a split sleeve provided with an arm 18 and with a triplicate cam 30 adapted to move over the cam surface 31 of the shoes. On each cam sleeve between its cam and arm is mounted a split sleeve provided with an arm 32 and with a triplicate cam 33 parallel with the cam 30 also adapted to move over the cam surfaces of the shoes.

The arms 18 are pivotally connected by rods 34 with the arms of a rock shaft 35, and the arms 32 are similarly connected with the arms of a rock shaft 36. The arms of the rock shaft 35 are pivotally connected by rods 37 with the brake foot pedal 5 and the arms of the rock shaft 36 are similarly connected with the hand lever 4.

The clutch brake collar 22 is pivotally connected with the arm of a bell crank 38, whose other arm is pivotally connected by a rod 39 with clutch foot-pedal 6.

From the above description it will appear that when the clutch brake A is forced by the spring 25 inside the fly wheel the springs which connect the shoes with their respective arms allow them to yield and prevent a drag on the shoes, thereby preventing an uneven wear of the contact surface. Furthermore the shoes can be easily removed when it becomes necessary to reline them.

When the foot brake is used to stop the car, the cams 30 force the shoes of the clutch brakes B outwardly until they are in frictional contact with the inner surfaces of the casings 9, and when released the contact is broken by the springs 27 pulling the shoes away. Similarly when the hand brake is used to stop the car the cam 33 forces the shoes in contact with the casings 9, and are similarly released by the springs 27. The shoes can be also removed for relining and, as the cam sleeves are split, they also can be removed for repair.

Having thus described my invention what I claim as new and desire to protect by Letters Patent, is:

1. In a friction brake, a shaft, a wheel mounted to rotate with the shaft and provided with a peripheral flange, a sleeve surrounding said shaft and provided with radial arms, shoes movably carried by said arms adapted to bear against the flange of the wheel, each shoe provided with radial ways for a corresponding arm, means operative to force said shoes into contact with the flange of the wheel, and yielding means operative between the shoes and the arms adapted to equalize the wear of the contact surface between the shoes and the flange of the wheel.

2. In a friction brake, a shaft, a wheel provided with a peripheral flange carried by the shaft, a sleeve provided with radial arms surrounding the shaft, a pair of bolts in radial alinement carried by each arm, a shoe to each arm adapted to bear against the flange of the wheel to join the shaft with the sleeve, each shoe provided with a radial slot to register with the bolts, and a yielding means operative between each shoe and a corresponding arm to equalize the bearing pressure between the shoes and the flange of the wheel, and means adapted to prevent the shoes from bearing against the flange of the wheel to disconnect the shaft from the sleeve.

3. In a friction brake, a shaft, a wheel provided with a peripheral flange carried by the shaft, a sleeve provided with radial arms surrounding the shaft, shoes adapted to bear against the flange to prevent the relative movement of the shaft and sleeve, said shoes provided with radial ways for the arms to cause the bearing of the shoes against the flange to be circumferential, and a bushing detachably mounted in the ways adapted to bear against the arms to take up the wear between the ways of the shoes and the arms of the sleeve.

In testimony whereof I have signed this specification in the presence of two subscribing witnesses.

CHARLES W. MITCHELL.

Witnesses:
  WILSON ROBERTS,
  CATHERINE C. SNYDER.